(12) United States Patent
Xian et al.

(10) Patent No.: US 9,973,621 B2
(45) Date of Patent: May 15, 2018

(54) CROSS-DEVICE SECURITY SCHEME FOR TETHERED DEVICES

(71) Applicant: Google LLC, Mountian View, CA (US)

(72) Inventors: Shijing Xian, Sunnyvale, CA (US);
Huisheng Wang, Palo Alto, CA (US);
Yang Lu, San Jose, CA (US)

(73) Assignee: Google LLC, Mountain View, CA (US)

(*) Notice: Subject to any disclaimer, the term of this patent is extended or adjusted under 35 U.S.C. 154(b) by 15 days.

(21) Appl. No.: 14/949,358

(22) Filed: Nov. 23, 2015

(65) Prior Publication Data

US 2017/0149958 A1   May 25, 2017

(51) Int. Cl.
| | |
|---|---|
| H04M 3/00 | (2006.01) |
| H04M 1/00 | (2006.01) |
| H04B 1/38 | (2015.01) |
| H04M 1/725 | (2006.01) |
| H04M 1/60 | (2006.01) |
| H04W 12/02 | (2009.01) |
| H04W 12/06 | (2009.01) |
| G06F 21/12 | (2013.01) |

(Continued)

(52) U.S. Cl.
CPC ........ H04M 1/72577 (2013.01); G06F 21/12 (2013.01); G06F 21/32 (2013.01); G06F 21/629 (2013.01); H04M 1/6058 (2013.01); H04W 12/02 (2013.01); H04W 12/06 (2013.01)

(58) Field of Classification Search
CPC ....... H04W 4/00; H04W 4/005; H04W 4/006; H04W 4/008; H04W 76/043; H04W 84/00; H04W 84/18; H04W 84/20; H04W 88/00; H04W 88/02; H04W 92/16; H04W 92/18

See application file for complete search history.

(56) References Cited

U.S. PATENT DOCUMENTS 7,257,374 B1   8/2007  Creigh
8,184,423 B2 *  5/2012  Rothkopf .............. G06F 1/1626
                                                 361/173

(Continued)

FOREIGN PATENT DOCUMENTS

| WO | 2008123667 A1 | 10/2008 |
| WO | WO-201042907 | 4/2015 |
| WO | 2015122091 A1 | 8/2015 |

OTHER PUBLICATIONS

International Search Report and Written Opinion of corresponding International Application No. PCT/US2016/063153 (dated Mar. 1, 2017).

*Primary Examiner* — San Htun
(74) *Attorney, Agent, or Firm* — McDonnell Boehnen Hulbert & Berghoff LLP; Michael D. Clifford (57) ABSTRACT

Embodiments help to provide a cross-device security schema for an audio device and a master device to which it is tethered (e.g., a smartphone). An example security scheme provides flexible mechanisms for locking and unlocking the audio device and the device to which it is tethered. For instance, an example security scheme may include: (a) an unlock sync feature that unlocks the audio device and keeps the audio device unlocked whenever the master device is unlocked, (b) a separate audio device unlock process that unlocks the audio device only (without unlocking the master device, and (c) an on-head detection process that, in at least some scenarios, locks the audio device in response to a determination that the audio device is not being worn.

18 Claims, 7 Drawing Sheets

(51) Int. Cl.
    *G06F 21/32*    (2013.01)
    *G06F 21/62*    (2013.01)

(56) References Cited

U.S. PATENT DOCUMENTS

| | | |
|---|---|---|
| 8,612,033 B2 | 12/2013 | Woo |
| 8,892,073 B2 | 11/2014 | Kakehi |
| 2002/0039427 A1 | 4/2002 | Whitwell et al. |
| 2005/0221798 A1* | 10/2005 | Sengupta ............... H04M 1/67 455/411 |
| 2008/0216171 A1 | 9/2008 | Sano et al. |
| 2010/0056055 A1* | 3/2010 | Ketari ................. H04L 63/068 455/41.3 |
| 2010/0304676 A1* | 12/2010 | Heo ....................... H04M 1/05 455/41.3 |
| 2012/0064951 A1* | 3/2012 | Agevik .................. G06F 3/012 455/569.1 |
| 2012/0245941 A1* | 9/2012 | Cheyer .................. G06F 21/32 704/246 |
| 2013/0024932 A1* | 1/2013 | Toebes ................... G06F 21/31 726/19 |
| 2014/0080544 A1 | 3/2014 | Chen |
| 2014/0314247 A1 | 10/2014 | Zhang |

\* cited by examiner

CROSS-DEVICE SECURITY SCHEME FOR TETHERED DEVICES

BACKGROUND

Wearable computing devices is becoming increasingly popular. For example, head-mountable display devices, smart watches, body-worn health monitors, and smart headphones or headsets, are becoming increasingly common.

In some cases, a wearable device may be tethered to another computing device. For example, Bluetooth headsets can be tethered to a user's smart phone in order to provide a hands-free mechanism to audio based functions. For example, a Bluetooth headset may allow a user to use voice commands to make and receive phone calls, and/or to dictate text messages, among other possibilities. When a wearable device, such as a Bluetooth headset, is tethered to another computing device, the wearable device may be able to access information stored on the other device, and may be able to control certain functions and/or features of the other device.

SUMMARY

Certain audio devices may be implemented as wearable devices. Such wearable audio devices can provide functionality that goes well beyond simple audio playback and control. A wearable audio device may provide "smart" features by tethering to and coordinating operations with another computing device such as a mobile phone, tablet, or laptop computer. In some cases, a wearable audio device providing such features may be referred to as a "smart audio device." Examples of such features may include voice control of phone calls, e-mails, text messaging, camera applications, and so on. For instance, using a wearable audio device tethered to their phone, a user could control applications one their phone without any direct interaction with their phone by saying, e.g., "take a photo", "make a call to xxx", "read emails", or "send a message to xxx", among other possibilities. These voice commands can trigger corresponding operations on the phone.

As part of such cross-device functionality, a wearable audio device may interface with applications that access personal and/or other sensitive information in the same way as, e.g., a smart phone to which the wearable audio device is tethered. As such, smart, wearable audio devices may create privacy and/or security risks, even when the device is not being worn by its user. For example, consider a scenario where a user gets up from their desk, and leaves their smart headset device lying on their desk. Absent security features, an unauthorized person walking by the desk might pick up the headset device and perform unwanted actions such as making a call to the owner's family, sending an awkward text message or e-mail to the owner's manager, and so on. In order the protect the users from privacy/security risks, example embodiments provide a cross-device security schema, which can be implemented to provide intuitive locking/unlocking features for a wearable audio device and the master device to which it is tethered.

In one aspect, a wearable audio device comprises: a communication interface configured for communication with a master computing device, at least one microphone, at least one processor; and, program instructions stored on a non-transitory computer-readable medium. The program instructions are executable by the at least one processor to: (a) determine that the master computing device is in an unlocked state, and responsively keep the wearable audio device in an unlocked state so long as the master computing device is unlocked; and (b) while the master computing device is in a locked state, implement a wearable audio device unlock process, wherein the wearable audio device unlock process provides a mechanism to unlock the wearable audio device independently from the master computing device. The program instructions may be further executable to enable an on-head detection feature, and, while the on-head detection feature is enabled: (a) keep the wearable audio device unlocked so long as the wearable audio device is determined to be worn, and (b) lock the wearable audio device in response to a determination that the wearable audio device is not being worn.

In another aspect, an apparatus comprises: a communication interface configured for communication with a wearable audio device, a graphic display, at least one processor, and program instructions stored on a non-transitory computer-readable medium. The program instructions are executable by the at least one processor to provide a graphical user-interface on the graphic display, wherein the graphical user-interface provides a plurality of interface elements to adjust lock-screen parameters of the wearable audio device, and wherein the plurality of interface elements comprise: (a) an interface element for adjustment of an unlock-sync feature, wherein enabling the unlock-sync feature causes the wearable audio device to operate in an unlocked state whenever the master device is in an unlocked state, and wherein disabling the unlock-sync feature allows the wearable audio device to operate in a locked state when the master device is in an unlocked state, and (b) an interface element for selection of a wearable audio device unlock process, wherein the selected wearable audio device unlock process provides a mechanism to unlock the wearable audio device, independent from whether the master device is in the locked state or the unlocked state. The plurality of interface elements of the GUI may further include an interface element for adjustment of an on-head detection feature, wherein enabling the on-head detection feature that causes the wearable audio device to lock in response to a determination that the wearable audio device is not being worn.

These as well as other aspects, advantages, and alternatives, will become apparent to those of ordinary skill in the art by reading the following detailed description, with reference where appropriate to the accompanying drawings.

DETAILED DESCRIPTION

Example methods and systems are described herein. It should be understood that the words "example" and "example" are used herein to mean "serving as an example, instance, or illustration." Any embodiment or feature described herein as being an "example" or "example" is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

I. Overview

An example cross-device security scheme may include a number of features that provide security, while also making locking and unlocking features intuitive for the user of a wearable audio device and a device to which the wearable audio device is tethered (e.g., a smart phone). An example cross-device security scheme may include a phone unlock process, an unlock synchronization feature that unlocks the wearable audio device whenever the smart phone is unlocked, a separate wearable audio device unlock process that unlocks the wearable audio device without unlocking the smart phone, and/or on-head detection that automatically locks the wearable audio device (at least in some scenarios) when the wearable audio device is not being worn. Combining some or all of these features may help to provide for intuitive locking and unlocking functions for both a wearable audio device and a device to which the wearable audio device is tethered, without sacrificing the security of information stored on the tethered-to device.

More specifically, when an unlock-sync feature and an independent wearable audio device unlock process are both implemented, a user may be provided with multiple ways to unlock the wearable audio device. For instance, when a user wants to use their wearable audio device and their smart phone in conjunction with one another, the user can unlock their wearable audio device and their smart phone at once, using only the unlock process for the smart phone. And, when the user wants to use their wearable audio device without unlocking their smart phone (e.g., so that they can leave their phone in their pocket), the user can unlock the wearable audio device, while allowing their phone to remain locked, using the separate wearable audio device unlock process. Note that when the wearable audio device is unlocked, the wearable audio device may access information and/or functions of the user's phone, while the phone itself remains locked and secure.

Further, when an on-head detection feature is implemented in conjunction with an unlock-sync feature and a separate wearable audio device unlock process, this may allow the user of the wearable audio device and a tethered phone to: (i) unlock only their wearable audio device using the separate wearable audio device unlock process (and to thus use the wearable audio device to securely access functionality on their smart phone while the smart phone itself is still locked), (ii) unlock the wearable audio device and their phone at once, using only the phone's unlock process (i.e., without requiring the use of separate wearable audio device unlock process), and (iii) have their wearable audio device automatically lock when it is not being worn (and in some cases, prevent the user from inadvertently unlocking their wearable audio device when the wearable audio device isn't being worn).

II. Illustrative Wearable Devices

Systems and devices in which exemplary embodiments may be implemented will now be described in greater detail. However, an exemplary system may also be implemented in or take the form of other devices, without departing from the scope of the invention.

An exemplary embodiment may be implemented in a wearable computing device that facilitates voice-based user interactions. However, embodiments related to wearable devices that do not facilitate voice-based user interactions are also possible. An illustrative wearable device may include an ear-piece with a bone-conduction speaker (e.g., a bone conduction transducer or "BCT"). A BCT may be operable to vibrate the wearer's bone structure at a location where the vibrations travel through the wearer's bone structure to the middle ear, such that the brain interprets the vibrations as sounds. The wearable device may take the form of an earpiece with a BCT, which can be tethered via a wired or wireless interface to a user's phone, or may be a stand-alone earpiece device with a BCT. Alternatively, the wearable device may be a glasses-style wearable device that includes one or more BCTs and has a form factor that is similar to traditional eyeglasses.

Figure 1A:
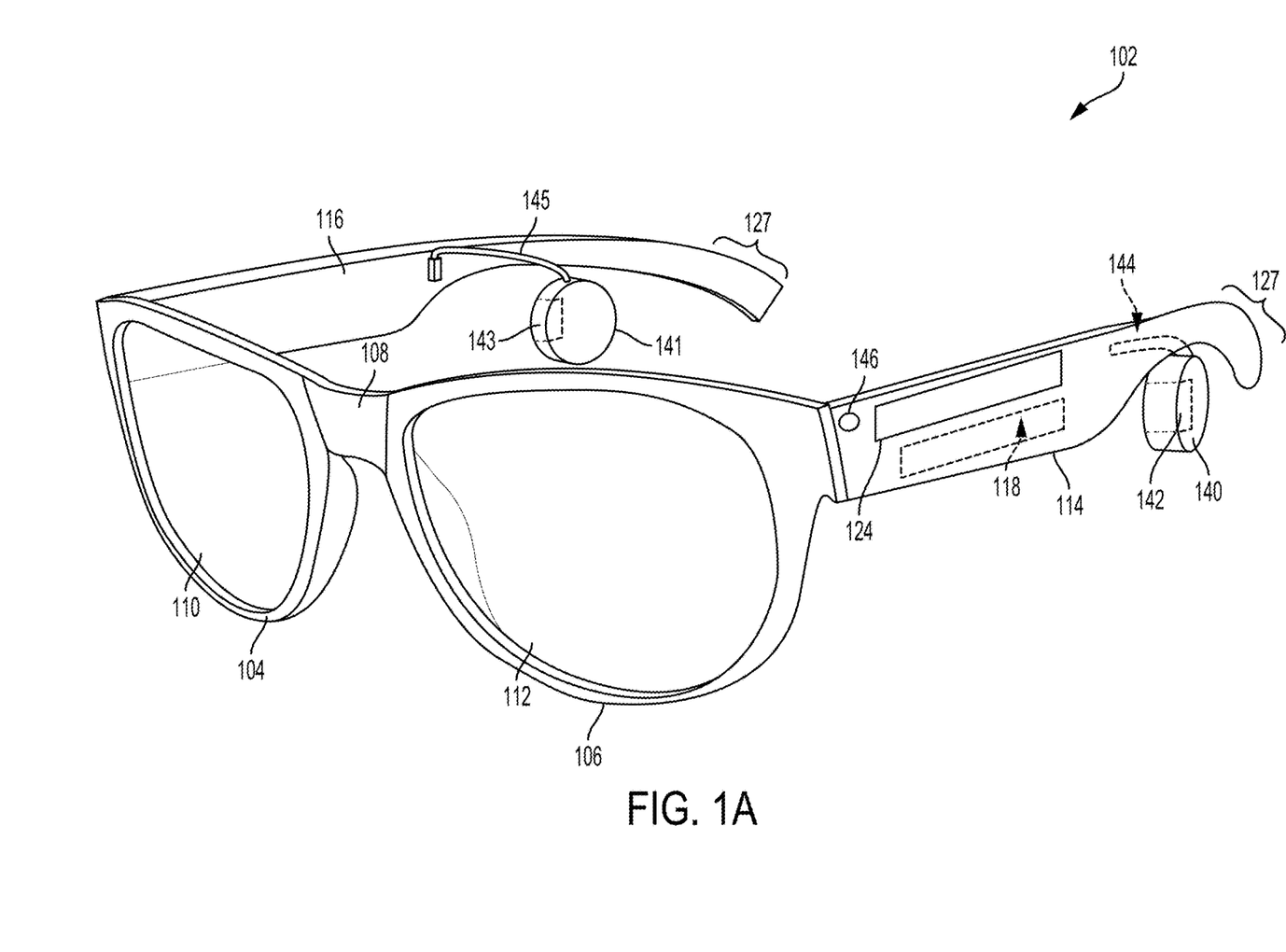
FIG. 1A illustrates a wearable computing device, according to an example embodiment.

FIG. 1A illustrates a wearable computing device 102, according to an exemplary embodiment. In FIG. 1A, the wearable computing device 102 takes the form of glasses-style wearable computing device. Note that wearable computing device 102 may also be considered an example of a head-mountable device (HMD), and thus may also be referred to as an HMD 102. It should be understood, however, that exemplary systems and devices may take the form of or be implemented within or in association with other types of devices, without departing from the scope of the invention. As illustrated in FIG. 1A, the wearable computing device 102 comprises frame elements including lens-frames 104, 106 and a center frame support 108, lens elements 110, 112, and extending side-arms 114, 116. The center frame support 108 and the extending side-arms 114, 116 are configured to secure the wearable computing device 102 to a user's head via placement on a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials are possible as well. Each of the lens elements 110, 112 may also be sufficiently transparent to allow a user to see through the lens element.

The extending side-arms 114, 116 may each be projections that extend away from the lens-frames 104, 106, respectively, and may be positioned behind a user's ears to secure the HMD 102 to the user's head. The extending side-arms 114, 116 may further secure the HMD 102 to the user by extending around a rear portion of the user's head. Additionally or alternatively, for example, the HMD 102 may connect to or be affixed within a head-mountable helmet structure. Other possibilities exist as well.

The HMD 102 may also include an on-board computing system 118 and at least one finger-operable touch pad 124. The on-board computing system 118 is shown to be integrated in side-arm 114 of HMD 102. However, an on-board computing system 118 may be provided on or within other parts of the head-mounted device 102 or may be positioned remotely from and communicatively coupled to a head-mountable component of a computing device (e.g., the on-board computing system 118 could be housed in a separate component that is not head wearable, and is wired or wirelessly connected to a component that is head wearable). The on-board computing system 118 may include a processor and memory, for example. Further, the on-board computing system 118 may be configured to receive and analyze data from a finger-operable touch pad 124 (and possibly from other sensory devices and/or user interface components).

In a further aspect, an HMD 102 may include various types of sensors and/or sensory components. For instance, HMD 102 could include an inertial measurement unit (IMU) (not explicitly shown in FIG. 1A), which provides an accelerometer, gyroscope, and/or magnetometer. In some embodiments, an HMD 102 could also include an accelerometer, a gyroscope, and/or a magnetometer that is not integrated in an IMU.

In a further aspect, HMD 102 may include sensors that facilitate a determination as to whether or not the HMD 102 is being worn. For instance, sensors such as an accelerometer, gyroscope, and/or magnetometer could be used to detect motion that is characteristic of the HMD being worn (e.g., motion that is characteristic of user walking about, turning their head, and so on), and/or used to determine that the HMD is in an orientation that is characteristic of the HMD being worn (e.g., upright, in a position that is typical when the HMD is worn over the ear). Accordingly, data from such sensors could be used as input to an on-head detection process. Additionally or alternatively, HMD 102 may include a capacitive sensor or another type of sensor that is arranged on a surface of the HMD 102 that typically contacts the wearer when the HMD 102 is worn. Accordingly data provided by such a sensor may be used to determine whether or not the HMD is being worn. Other sensors and/or other techniques may also be used to detect when the HMD is being worn.

HMD 102 also includes at least one microphone 146, which may allow the HMD 102 to receive voice commands from a user. The microphone 146 may be a directional microphone or an omni-directional microphone. Further, in some embodiments, an HMD 102 may include a microphone array and/or multiple microphones arranges at various locations on the HMD.

In FIG. 1A, touch pad 124 is shown as being arranged on side-arm 114 of the HMD 102. However, the finger-operable touch pad 124 may be positioned on other parts of the HMD 102. Also, more than one touch pad may be present on the head-mounted device 102. For example, a second touchpad may be arranged on side-arm 116. Additionally or alternatively, a touch pad may be arranged on a rear portion 127 of one or both side-arms 114 and 116. In such an arrangement, the touch pad may arranged on an upper surface of the portion of the side-arm that curves around behind a wearer's ear (e.g., such that the touch pad is on a surface that generally faces towards the rear of the wearer, and is arranged on the surface opposing the surface that contacts the back of the wearer's ear). Other arrangements of one or more touch pads are also possible.

The touch pad 124 may sense the touch and/or movement of a user's finger on the touch pad via capacitive sensing, resistance sensing, or a surface acoustic wave process, among other possibilities. In some embodiments, touch pad 124 may be a one-dimensional or linear touchpad, which is capable of sensing touch at various points on the touch surface, and of sensing linear movement of a finger on the touch pad (e.g., movement forward or backward along the side-arm 124). In other embodiments, touch pad 124 may be a two-dimensional touch pad that is capable of sensing touch in any direction on the touch surface. Additionally, in some embodiments, touch pad 124 may be configured for near-touch sensing, such that the touch pad can sense when a user's finger is near to, but not in contact with, the touch pad. Further, in some embodiments, touch pad 124 may be capable of sensing a level of pressure applied to the pad surface.

In a further aspect, earpiece 140 and 141 are attached to side-arms 114 and 116, respectively. Earpieces 140 and 141 can each include a BCT 142 and 143, respectively. Each earpiece 140, 141 may be arranged such that when the HMD 102 is worn, each BCT 142, 143 is positioned to the posterior of a wearer's ear. For instance, in an exemplary embodiment, an earpiece 140, 141 may be arranged such that a respective BCT 142, 143 can contact the auricle of both of the wearer's ear. Other arrangements of earpieces 140, 141 are also possible. Further, embodiments with a single earpiece 140 or 141 are also possible.

In an exemplary embodiment, a BCT, such as BCT 142 and/or BCT 143, may operate as a bone-conduction speaker. For instance, a BCT may be implemented with a vibration transducer that is configured to receive an audio signal and to vibrate a wearer's bone structure in accordance with the audio signal. More generally, it should be understood that any component that is arranged to vibrate a wearer's bone structure may be incorporated as a bone-conduction speaker, without departing from the scope of the invention.

In a further aspect, HMD 102 may include at least one audio source (not shown) that is configured to provide an audio signal that drives BCT 142 and/or BCT 143. For instance, in an exemplary embodiment, an HMD 102 may include an internal audio playback device such as an on-board computing system 118 that is configured to play digital audio files. Additionally or alternatively, an HMD 102 may include an audio interface to an auxiliary audio playback device (not shown), such as a portable digital audio player, a smartphone, a home stereo, a car stereo, and/or a personal computer, among other possibilities. In some embodiments, an application or software-based interface may allow for the HMD 102 to receive an audio signal that is streamed from another computing device, such as the user's mobile phone. An interface to an auxiliary audio playback device could additionally or alternatively be a tip, ring, sleeve (TRS) connector, or may take another form. Other audio sources and/or audio interfaces are also possible.

Further, in an embodiment with two ear-pieces 140 and 141, which both include BCTs, the ear-pieces 140 and 141 may be configured to provide stereo audio. However, non-stereo audio is also possible in devices that include two ear-pieces.

Figure 1B:
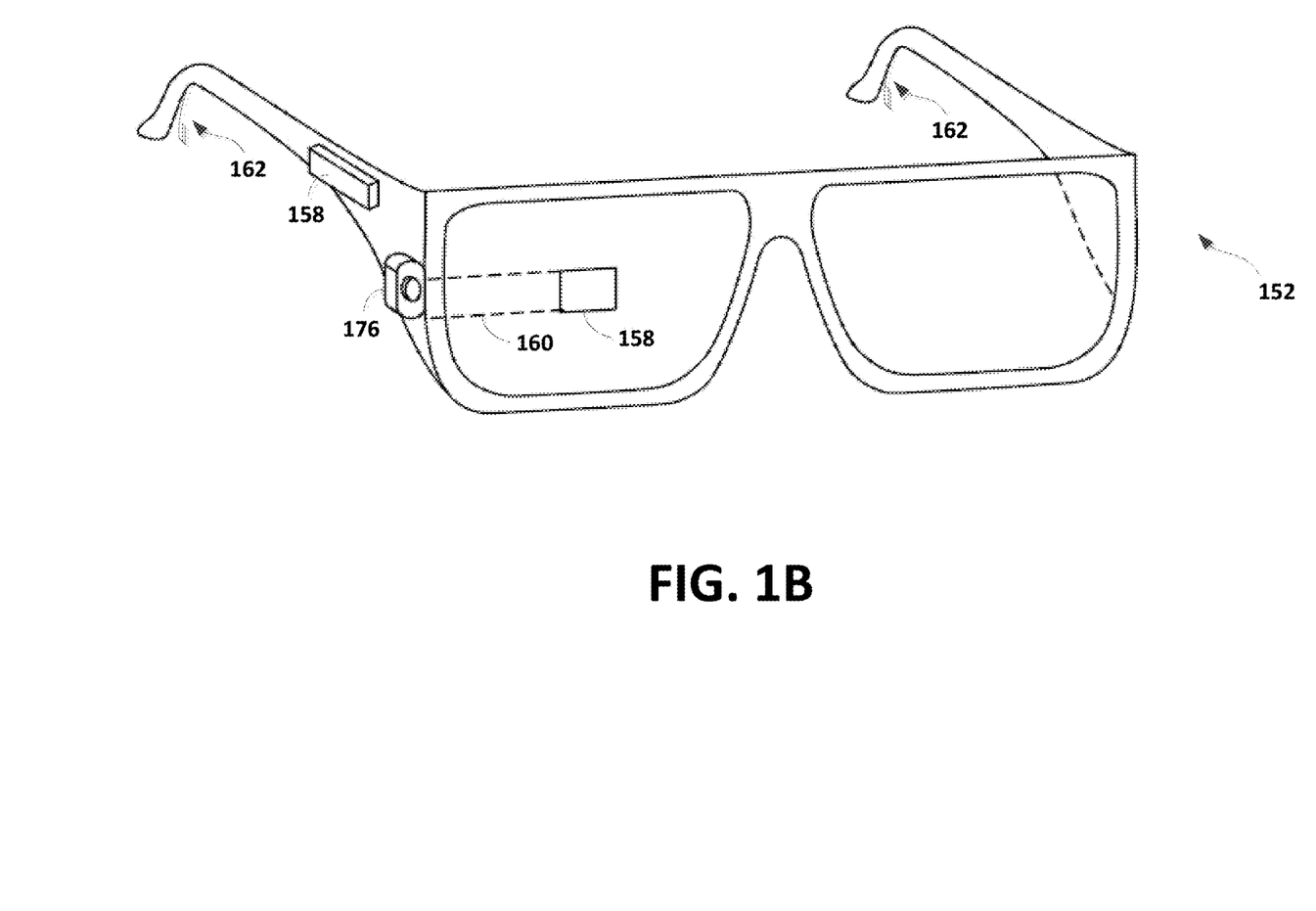
FIG. 1B shows another wearable computing device, according to an example embodiment.

Note that in the example shown in FIG. 1A, HMD 102 does not include a graphical display. FIG. 1B shows another wearable computing device 152 according to an example embodiment, which is similar to the HMD shown in FIG. 1B but includes a graphical display. In particular, the wearable computing device shown in FIG. 1B takes the form of a glasses-style HMD 152 with a near-eye display 158. As shown, HMD 152 may include BCTs 162 that is configured and functions similarly to BCTs 142 and 143, an onboard computing system 158 that is configured and functions similarly to onboard computing system 118, and a microphone 176 that is configured and functions similarly to microphone 146. HMD 152 may additionally or alternatively include other components, which are not shown in FIG. 1B.

HMD 152 includes a single graphical display 158, which may be coupled to the on-board computing system 158, to a standalone graphical processing system, and/or to other components of HMD 152. The display 158 may be formed on one of the lens elements of the HMD 152, such as a lens element described with respect to FIG. 1A, and may be configured to overlay computer-generated graphics in the wearer's field of view, while also allowing the user to see through the lens element and concurrently view at least some of their real-world environment. (Note that in other embodiments, a virtual reality display that substantially obscures the user's view of the physical world around them is also possible.) The display 158 is shown to be provided in a center of a lens of the HMD 152, however, the display 158 may be provided in other positions, and may also vary in size and shape. The display 158 may be controllable via the computing system 154 that is coupled to the display 158 via an optical waveguide 160.

Other types of near-eye displays are also possible. For example, a glasses-style HMD may include one or more projectors (not shown) that are configured to project graphics onto a display on an inside surface of one or both of the lens elements of HMD. In such a configuration, the lens element(s) of the HMD may act as a combiner in a light projection system and may include a coating that reflects the light projected onto them from the projectors, towards the eye or eyes of the wearer. In other embodiments, a reflective coating may not be used (e.g., when the one or more projectors take the form of one or more scanning laser devices).

As another example of a near-eye display, one or both lens elements of a glasses-style HMD could include a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame of the HMD for driving such a matrix display. Alternatively or additionally, a laser or LED source and scanning system could be used to draw a raster display directly onto the retina of one or more of the user's eyes. Other types of near-eye displays are also possible.

Generally, it should be understood that an HMD and other types of wearable devices may include other types of sensors and components, in addition or in the alternative to those described herein. Further, variations on the arrangements of sensory systems and components of an HMD described herein, and different arrangements altogether, are also possible.

Figure 2A:
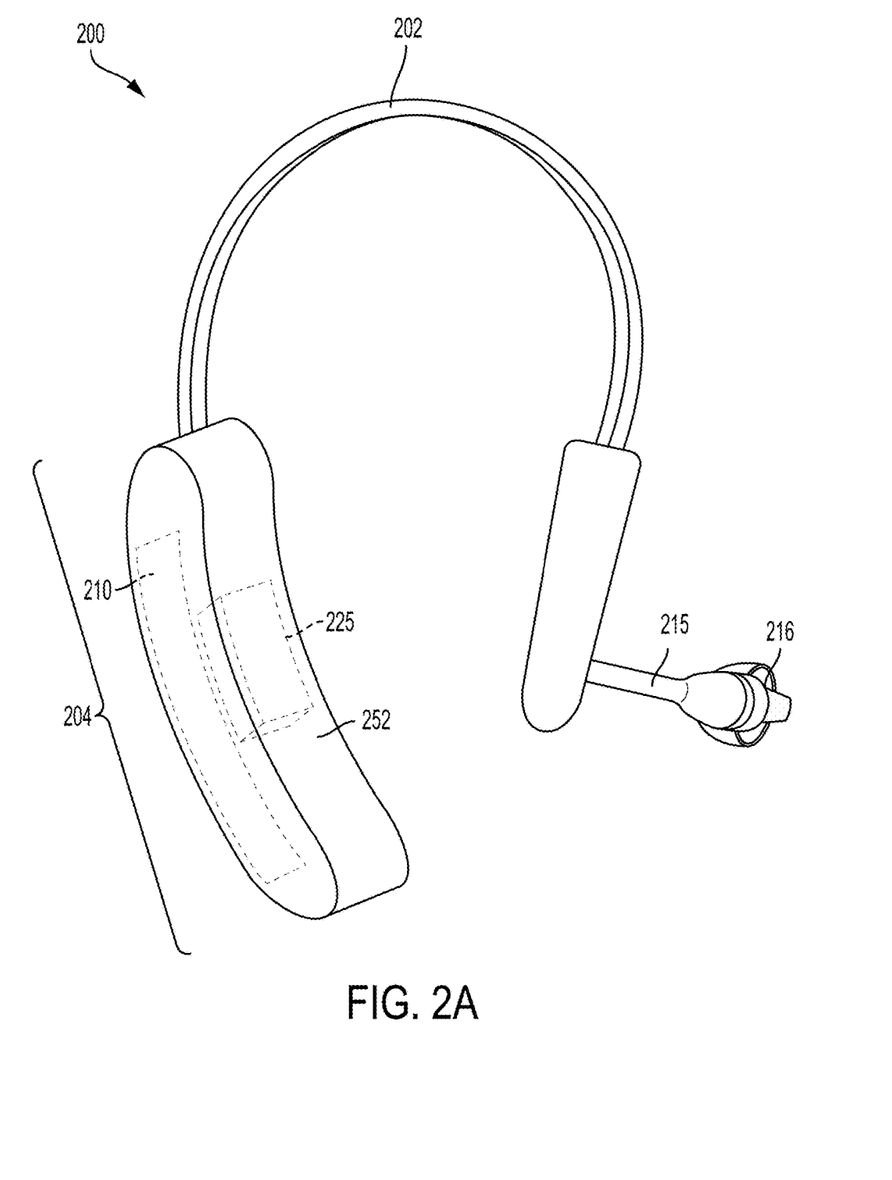
FIGS. 2A to 2C show yet another wearable computing device, according to an example embodiment.
Figure 2B:
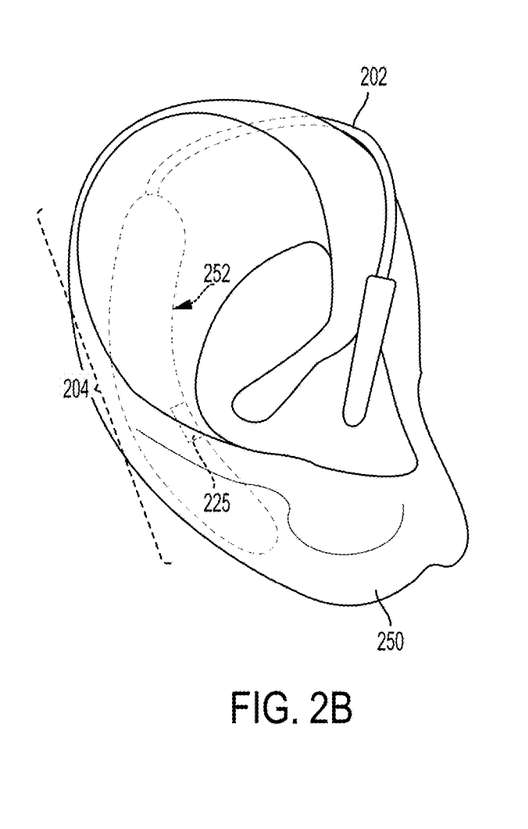
Figure 2C:
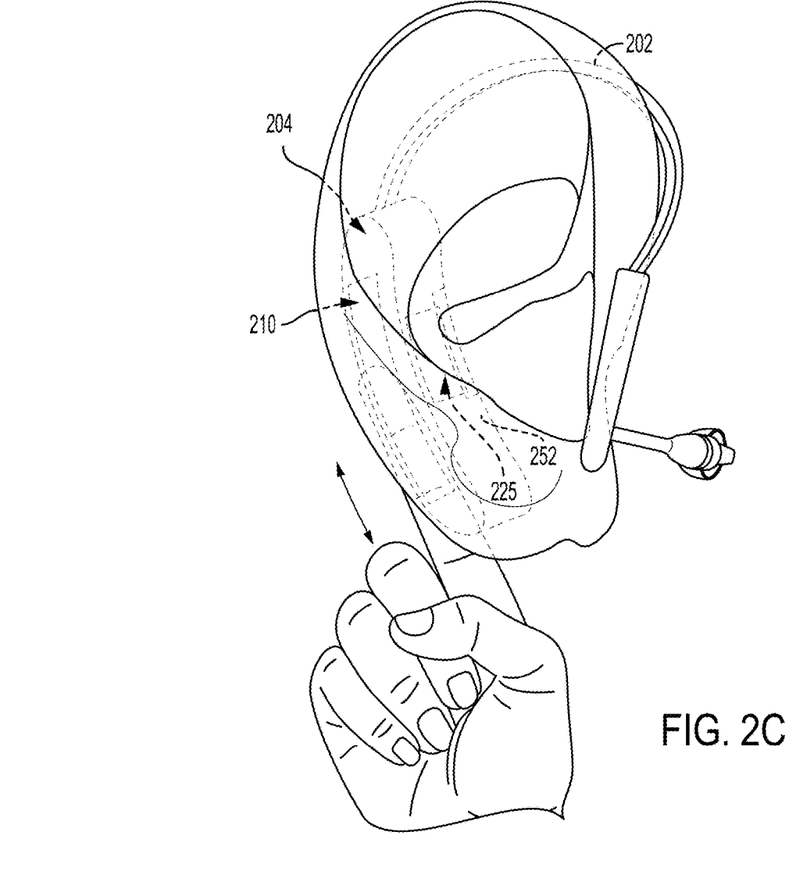

FIGS. 2A to 2C show another wearable computing device according to an example embodiment. More specifically, FIGS. 2A to 2C shows an earpiece device 200, which includes a frame 202 and a behind-ear housing 204. As shown in FIG. 2B, the frame 202 is curved, and is shaped so as to hook over a wearer's ear 250. When hooked over the wearer's ear 250, the behind-ear housing 204 is located behind the wearer's ear, For example, in the illustrated configuration, the behind-ear housing 204 is located behind the auricle, such that a surface 252 of the behind-ear housing 204 contacts the wearer on the back of the auricle.

Note that the behind-ear housing 204 may be partially or completely hidden from view, when the wearer of earpiece device 200 is viewed from the side. As such, an earpiece device 200 may be worn more discretely than other bulkier and/or more visible wearable computing devices.

Referring back to FIG. 2A, the behind-ear housing 204 may include a BCT 225, and touch pad 210. BCT 225 may be, for example, a vibration transducer or an electro-acoustic transducer that produces sound in response to an electrical audio signal input. As such, BCT 225 may function as a bone-conduction speaker that plays audio to the wearer by vibrating the wearer's bone structure. Other types of BCTs are also possible. Generally, a BCT may be any structure that is operable to directly or indirectly vibrate the bone structure of the user.

As shown in FIG. 2C, the BCT 225, may be arranged on or within the behind-ear housing 204 such that when the earpiece device 200 is worn, BCT 225 is positioned posterior to the wearer's ear, in order to vibrate the wearer's bone structure. More specifically, BCT 225 may form at least part of, or may be vibrationally coupled to the material that forms, surface 252 of behind-ear housing 204. Further, earpiece device 200 may be configured such that when the device is worn, surface 252 is pressed against or contacts the back of the wearer's ear. As such, BCT 225 may transfer vibrations to the wearer's bone structure via surface 252. Other arrangements of a BCT on an earpiece device are also possible.

As shown in FIG. 2C, the touch pad 210 may arranged on a surface of the behind-ear housing 204 that curves around behind a wearer's ear (e.g., such that the touch pad is generally faces towards the wearer's posterior when the earpiece device is worn). Other arrangements are also possible.

In some embodiments, touch pad 210 may be a one-dimensional or linear touchpad, which is capable of sensing touch at various points on the touch surface, and of sensing linear movement of a finger on the touch pad (e.g., movement upward or downward on the back of the behind-ear housing 204). In other embodiments, touch pad 210 may be a two-dimensional touch pad that is capable of sensing touch in any direction on the touch surface. Additionally, in some embodiments, touch pad 210 may be configured for near-touch sensing, such that the touch pad can sense when a user's finger is near to, but not in contact with, the touch pad. Further, in some embodiments, touch pad 210 may be capable of sensing a level of pressure applied to the pad surface.

In the illustrated embodiment, earpiece device 200 also includes a microphone arm 215, which may extend towards a wearer's mouth, as shown in FIG. 2B. Microphone arm 215 may include a microphone 216 that is distal from the earpiece. Microphone 216 may be an omni-directional microphone or a directional microphone. Further, an array of microphones could be implemented on a microphone arm 215. Alternatively, a bone conduction microphone (BCM), could be implemented on a microphone arm 215. In such an embodiment, the arm 215 may be operable to locate and/or press a BCM against the wearer's face near or on the wearer's jaw, such that the BCM vibrates in response to vibrations of the wearer's jaw that occur when they speak. Note that the microphone arm is 215 is optional, and that other configurations for a microphone are also possible. Further, in some embodiments, ear bud 215 may be a removable component, which can be attached and detached from the earpiece device by the user.

In some embodiments, a wearable device may include two types of microphones: one or more microphones arranged specifically to detect speech by the wearer of the device, and one or more microphones that are arranged to detect sounds in the wearer's environment (perhaps in addition to the wearer's voice). Such an arrangement may facilitate intelligent processing based on whether or not audio includes the wearer's speech.

In some embodiments, a wearable device may include an ear bud (not shown), which may function as a typical speaker and vibrate the surrounding air to project sound from the speaker. Thus, when inserted in the wearer's ear, the wearer may hear sounds in a discrete manner. Such an ear bud is optional, and may be implemented a removable (e.g., modular) component, which can be attached and detached from the earpiece device by the user.

III. Illustrative Computing Devices

Figure 3:
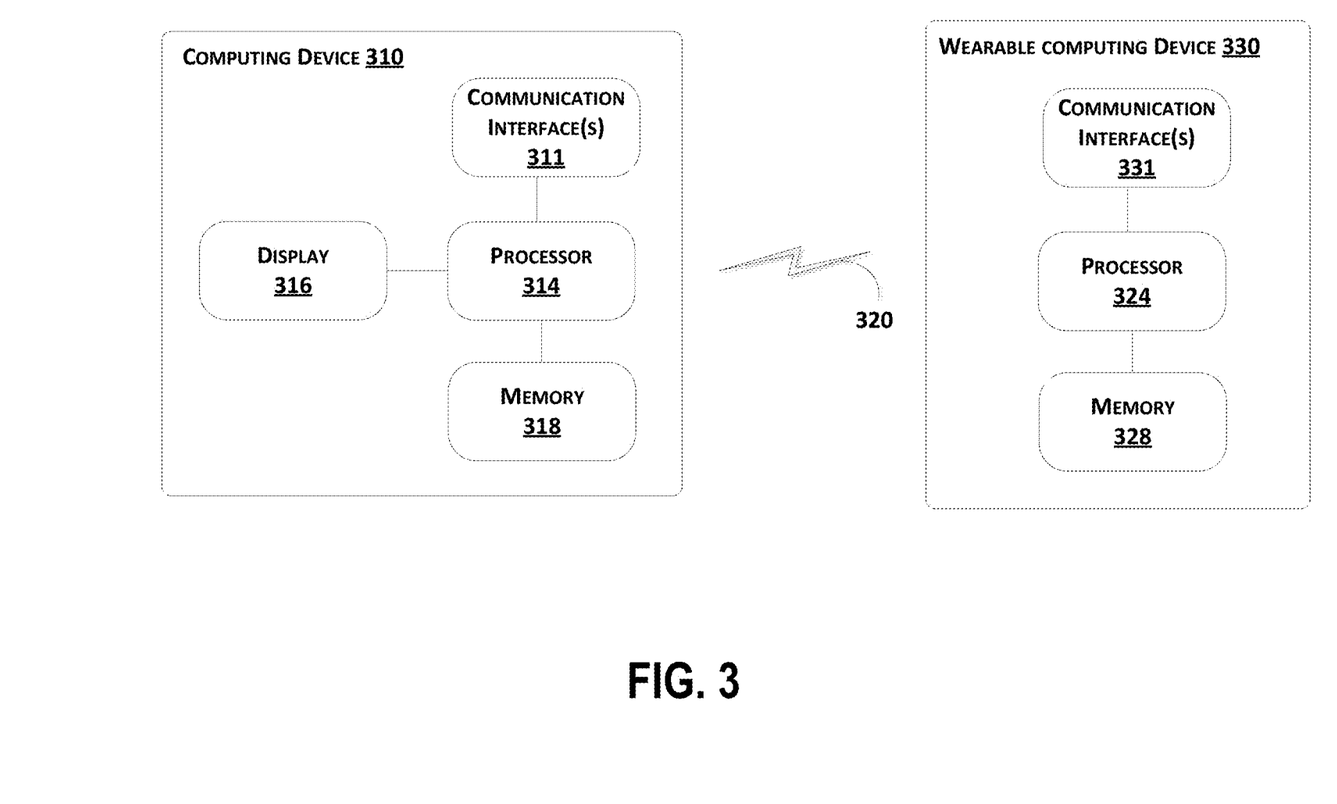
FIG. 3 is a block diagram showing components of a computing device and a wearable computing device, according to an example embodiment

FIG. 3 is a block diagram showing basic components of a computing device 310 and a wearable computing device 330, according to an example embodiment. In an example configuration, computing device 310 and wearable computing device 330 are operable to communicate via a communication link 320 (e.g., a wired or wireless connection). Computing device 310 may be any type of device that can receive data and display information corresponding to or associated with the data. For example, the computing device 310 may be a mobile phone, a tablet computer, a laptop computer, a desktop computer, or an in-car computer, among other possibilities. Wearable computing device 330 may be a wearable computing device such as those described in reference to FIGS. 1A, 1B, 2A, 2B, and 2C, a variation on these wearable computing devices, or another type of wearable computing device altogether.

The wearable computing device 330 and computing device 310 include hardware and/or software to enable communication with one another via the communication link 320, such as processors, transmitters, receivers, antennas, etc. In the illustrated example, computing device 310 includes one or more communication interfaces 311, and wearable computing device 330 includes one or more communication interfaces 331. As such, the wearable computing device 330 may be tethered to the computing device 310 via a wired or wireless connection. Note that such a wired or wireless connection between computing device 310 and wearable computing device 330 may be established directly (e.g., via Bluetooth), or indirectly (e.g., via the Internet or a private data network).

In a further aspect, note that while computing device 310 includes a graphic display system 316, the wearable computing device 330 does not include a graphic display. In such a configuration, wearable computing device 330 may be configured as a wearable audio device, which allows for advanced voice control and interaction with applications running on another computing device 310 to which it is tethered.

As noted, communication link 320 may be a wired link, such as a universal serial bus or a parallel bus, or an Ethernet connection via an Ethernet port. A wired link may also be established using a proprietary wired communication protocol and/or using proprietary types of communication interfaces. The communication link 320 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

As noted above, to communicate via communication link 320, computing device 310 and wearable computing device 330 may each include one or more communication interface(s) 311 and 331 respectively. The type or types of communication interface(s) included may vary according to the type of communication link 320 that is utilized for communications between the computing device 310 and the wearable computing device 330. As such, communication interface(s) 311 and 331 may include hardware and/or software that facilitates wired communication using various different wired communication protocols, and/or hardware and/or software that facilitates wireless communications using various different wired communication protocols.

Computing device 310 and wearable computing device 330 include respective processing systems 314 and 324. Processors 314 and 324 may be any type of processor, such as a micro-processor or a digital signal processor, for example. Note that computing device 310 and wearable computing device 330 may have different types of processors, or the same type of processor. Further, one or both of computing device 310 and a wearable computing device 330 may include multiple processors.

Computing device 310 and a wearable computing device 330 further include respective on-board data storage, such as memory 318 and memory 328. Processors 314 and 324 are communicatively coupled to memory 318 and memory 328, respectively. Memory 318 and/or memory 328 (any other data storage or memory described herein) may be computer-readable storage media, which can include volatile and/or non-volatile storage components, such as optical, magnetic, organic or other memory or disc storage. Such data storage can be separate from, or integrated in whole or in part with one or more processor(s) (e.g., in a chipset). In some implementations, the data storage 104 can be implemented using a single physical device (e.g., one optical, magnetic, organic or other memory or disc storage unit), while in other implementations, the data storage 104 can be implemented using two or more physical devices.

Memory 318 can store machine-readable program instructions that can be accessed and executed by the processor 314. Similarly, memory 328 can store machine-readable program instructions that can be accessed and executed by the processor 324.

In an exemplary embodiment, memory 318 may include program instructions stored on a non-transitory computer-readable medium and executable by the at least one processor to provide a graphical user-interface (GUI) on a graphic display 316. The GUI may include a number of interface elements to adjust lock-screen parameters of the wearable computing device 330 and the computing device 310. These interface elements may include: (a) an interface element for adjustment of an unlock-sync feature, wherein enabling the unlock-sync feature causes the wearable audio device to operate in an unlocked state whenever the master device is in an unlocked state, and wherein disabling the unlock-sync feature allows the wearable audio device to operate in a locked state when the master device is in an unlocked state, and (b) an interface element for selection of a wearable audio device unlock process, wherein the selected wearable audio device unlock process provides a mechanism to unlock the wearable audio device, independent from whether the master device is in the locked state or the unlocked state.

In a further aspect, a communication interface 311 of the computing device 310 may be operable to receive a communication from the wearable audio device that is indicative of whether or not the wearable audio device is being worn. Such a communication may be based on sensor data generated by at least one sensor of the wearable audio device. As such, memory 318 may include program instructions providing an on-head detection module. Such program instructions may to: (i) analyze sensor data generated by a sensor or sensors on the wearable audio device to determine whether or not the wearable audio device is being worn; and (ii) in response to a determination that the wearable audio device is not being worn, lock the wearable audio device (e.g., by sending a lock instruction to the wearable audio device).

IV. Illustrative Cross-Device Security Schemes

Figure 4:
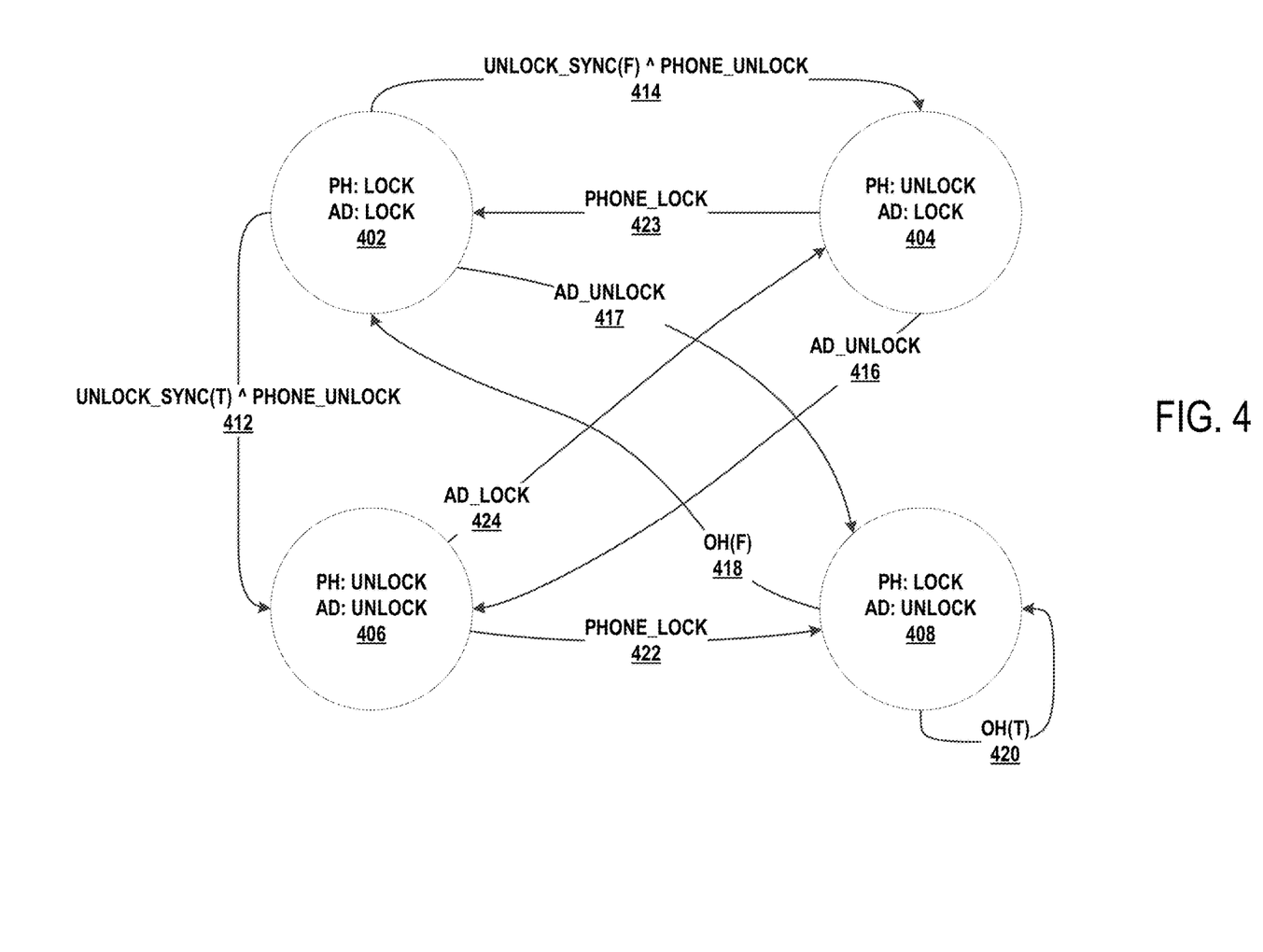
FIG. 4 is a state diagram for an example cross-device security scheme, according to an example embodiment.

As noted above, an example cross-device security schema may include a number of features that provide security, while also making locking and unlocking features intuitive for a audio device (e.g., a wearable audio device) and the master device (e.g., a smart phone) to which the audio device is tethered. FIG. 4 shows a state diagram for an example cross-device schema in which the master device is a smart phone (PH), and in which there are four possible cross-device states: (1) PH locked and audio device locked (state 402), (2) PH unlocked and audio device locked (state 404), (3) PH unlocked and audio device unlocked (state 406), and (4) PH locked and audio device unlocked (state 408). Note that in this example, the audio device may also be referred to as a wearable audio device.

In one aspect, the cross-device schema shown in FIG. 4 includes an unlock-sync feature (UNLOCK_SYNC). Enabling the unlock-sync feature causes the wearable audio device to remain in an unlocked state whenever the master device is in an unlocked state. As such, when a user successfully unlocks their smart phone, this will automatically unlock the wearable audio device as well, as shown by transition 412 between state 402 and state 406. Further, when the unlock-sync feature is enabled, the wearable audio device will remain unlocked so long as the phone is unlocked. The unlock-sync feature may be useful when a user wishes to, e.g., put their phone down and use their wearable audio device to control applications on the phone (and free up their hands to multi-task).

On the other hand, if a user disables the unlock-sync feature, this allows the wearable audio device to lock while the master device is in an unlocked state. As such, a user can unlock their smart phone, without unlocking their wearable audio device as well, as represented by transition 414. In an example embodiment, a user may be able to enable and disable the unlock-sync feature via a GUI on their phone.

Further, note that in an exemplary embodiment, the unlock-sync feature may only sync the unlocked state of the wearable audio device to the unlocked state of the phone, and does not sync the phone's unlocked state to the wearable audio device's unlocked state. In other words, the unlock-sync feature does not keep the phone unlocked when the wearable audio device is unlocked. As such, a phone lock process may allow for separate locking of the phone, even when the unlock-sync feature is enabled, as shown by transitions 422 and 423.

In a scenario where the phone is locked and the wearable audio device is unlocked (e.g., state 408), a security risk could exist due to the inability of the user to use their phone to lock their wearable audio device. Accordingly, an example cross-device security schema may be enhanced by a wearable audio device that is configured with sensor system(s) that help determine whether or not the wearable audio device is being worn. For instance, the cross-device schema shown in FIG. 4 is implemented in conjunction with a wearable audio device that is configured for on-head (OH) detection. Accordingly, an example schema may specify to lock the wearable audio device in response to a determination that the wearable audio device is not being worn, as represented by transition 418. (Correspondingly, in some embodiments, when in state 408, the wearable audio device may remain unlocked so long as on-head detection indicated the wearable audio device is being worn, as shown by transition 420.) Note that in some implementations, after first detecting sensor data indicating the wearable audio device is not being worn, the wearable audio device may wait for some predetermined amount of time before responsively locking. And, if sensor data indicates that the wearable audio device is being worn again, before the predetermined amount of time has elapsed, then the wearable audio device will not lock.

In some embodiments, an on-head detection feature may only be enabled when the phone is locked and the wearable audio device is unlocked (state 408). For example, when the unlock-sync is enabled, there is little need to lock the wearable audio device while the phone is unlocked. As such, the on-head detection may be disabled when the phone is unlocked. And correspondingly, on-head detection may be enabled in response to an instruction to lock the master device, as shown by transition 422.

In a further aspect, the cross device schema shown in FIG. 4 provides a wearable audio device unlock process, which can be used to unlock the wearable audio device, regardless of whether the master device is in the locked state or the unlocked state. More specifically, if the phone is unlocked and the wearable audio device is locked (state 404), then the wearable audio device unlock process may be utilized to unlock the wearable audio device, as shown by transition 416. Further, if the phone and wearable audio device are both locked (state 402), then the wearable audio device unlock process may be utilized to unlock the wearable audio device, while allowing the phone to remain locked, as shown by transition 417.

Various types of wearable audio device unlock processes are possible. For example, the wearable audio device unlock process may involve the user speaking a pre-defined pass phrase, a voiceprint process that recognizes characteristics of an authorized user's voice, or a combination of a pass phrase and voiceprint process, among other possibilities. Further, in an example embodiment, a user may be to select the particular wearable audio device unlock process that will be utilized via a GUI on their phone.

In a further aspect, an example cross-device security schema may include a mechanism that allows a user to explicitly lock the wearable audio device, in addition to automatic wearable audio device locking using on on-head detection. For example, a user could tap and hold a touchpad on their wearable audio device or speak a pre-determined locking phrase in order to lock their wearable audio device. Such a separate wearable audio device locking process is represented by transition 424, which locks the wearable audio device while allowing the phone to remain unlocked). While not shown, such a separate wearable audio device locking process could also be utilized in state 408, in order to lock the wearable audio device and transition to state 402. The wearable audio device locking process could take various forms, such as a simple voice command, or touch input using a GUI feature that explicitly indicates to lock the wearable audio device (without also locking the device to which the wearable audio device is tethered).

In an example embodiment, there may also be an option where a user can elect to turn off security features for both the wearable audio device and its master device. Such an option may be useful if a user is not concerned about information and/or functionality that is accessible via the wearable audio device and/or their smart phone.

V. Illustrative GUI for Cross-Device Security Scheme

Figure 5:
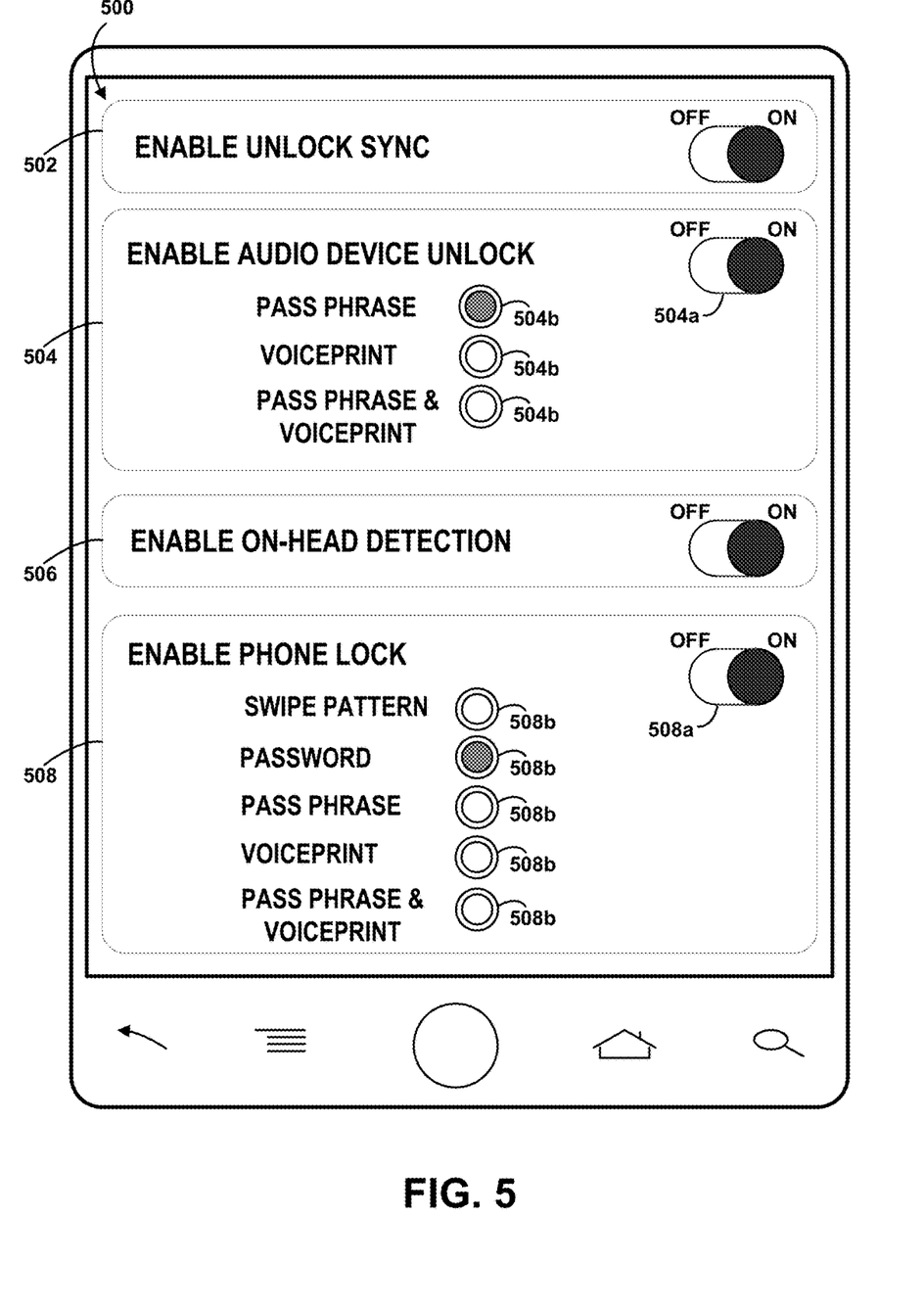
FIG. 5 is an illustration of a graphical user interface, according to an example embodiment.

FIG. 5 illustrates an example GUI 500 for controlling a cross-device security scheme. The GUI may be displayed on the display of, and implemented by, a computing device that is communicatively coupled with a wearable audio device. To facilitate display of the GUI, the computing device may include a communication interface configured for communication with the wearable audio device, a graphic display, at least one processor, and program instructions stored on a non-transitory computer-readable medium and executable by the at least one processor to provide a graphical user-interface on the graphic display. For explanatory purposes, GUI will be described as being displayed by a smart phone (or simply by a phone) and a wearable audio device. Of course, an example GUI may be implemented by and displayed on the displays of other types of computing devices as well.

A. Unlock Synchronization

As shown, GUI 500 includes an interface element 502 for adjustment of an unlock-sync feature. In the illustrated embodiment, the interface element 502 for adjustment of the unlock-sync feature is a toggle switch that can be interacted with to turn the unlock-sync feature on and off. As such, interface element 502 may also be referred to herein as an unlock-sync toggle 502. In an example embodiment, the unlock-sync toggle 502 may be switched to the "on" position to enable the unlock-sync feature, and switched to the "off" position to disable the unlock-sync feature. As such, when the unlock-sync toggle 502 is switched on, the wearable audio device will operate in an unlocked state whenever the master device is in an unlocked state. On the other hand, when the unlock-sync toggle 502 is switched off, this will disable the unlock-sync feature and allows the wearable audio device to operate in a locked state when the master device is in an unlocked state.

B. Selection of Wearable Audio Device Unlock Process

In a further aspect, GUI 500 also includes an interface element 504 that allows for selection of a wearable audio device unlock process, which may also be referred to as the wearable audio device unlock selection element 504. In the illustrated example, interface element 504 includes a wearable audio device unlock toggle 504*a*, which can be enables and disables the use of a selected wearable audio device unlock process to unlock the wearable audio device without unlocking the master device. Interface element 504 also includes wearable audio device unlock process features 504*b*, which allow for the selection of the particular wearable audio device unlock process that is used when the wearable audio device unlock toggle 504*a*. In the illustrated example, the wearable audio device unlock selection element 504 includes wearable audio device unlock process features 504*b* for pass phrase authentication, voiceprint authentication, and a combination of a pass phrase and voiceprint authorization.

Referring now to the wearable audio device unlock toggle 504*a* in greater detail, this toggle can be switched to the "on" position to enable a selected wearable audio device unlock process, and can be switched to the "off" to disable separate unlocking of wearable audio device (such that the wearable audio device can only be unlocked by unlocking the master device, respectively). As such, when the wearable audio device unlock toggle 504*a* is switched on, a selected wearable audio device unlock process can be used to unlock the wearable audio device only, regardless of whether the master device is in the locked state or the unlocked state. Conversely, when the wearable audio device unlock toggle 504*a* is switched off, the user will not be provided with a process to explicitly unlock the wearable audio device.

In some embodiments, when the wearable audio device unlock toggle 504*a* is switched off, the wearable audio device unlock process features 504*b* may be disabled, such that the user cannot interact with the wearable audio device unlock process features 504*b*. Further, when the wearable audio device unlock toggle 504*a* is switched off, GUI 500 may visually indicate that the wearable audio device unlock process features 504*b* are disabled. For example, the wearable audio device unlock process features 504*b* may be "greyed out." Other examples are also possible.

As noted above, when the wearable audio device unlock toggle 504*a* is switched on, the user may select a desired unlock process for a wearable audio device that is tethered to the computing device on which GUI 500 is displayed. To do so, a user may interact with the wearable audio device unlock process feature 504*b* for the desired unlock process. For instance, when GUI 500 is displayed on a smart phone's touchscreen, a user could tap the graphic feature for "voiceprint authentication" to enable voiceprint authentication as the unlock process for their wearable audio device. Further, interface element 504 may visually indicate which wearable audio device unlock process feature 504*b* is selected. For example, the circular icon for the selected wearable audio device unlock process feature 504*b* may be shaded when the indicated unlock process is selected, and unshaded when the indicated unlock process is not selected. Other examples are also possible.

In a further aspect, note that a locking schema that is the same or similar to the schema shown in FIG. 4 may be established via GUI 500 by using unlock-sync toggle 502 to enable the unlock-sync feature and using wearable audio device unlock selection element 504 to concurrently enable and select a separate wearable audio device unlock process. Importantly, a unlocking scheme provided when both these features are enabled provides multiple ways to unlock the wearable audio device (e.g., by unlocking the master device, or by using the wearable audio device unlock process to separately unlock the wearable audio device), which may enhance the user experience provided by the wearable audio device, without comprising security of a user's data stored on the wearable audio device or the device to which the wearable audio device is tethered. In particular, with both these feature enabled, the user can unlock the wearable audio device only with the selected wearable audio device unlock process, and use the wearable audio device to securely access functionality on their smart phone, while the smart phone itself is still locked (such that the same functionality is not accessible via the phone). However, wants to use their phone and wearable audio device at the same time, the unlock sync feature allows the user to unlock their phone and wearable audio device at once (by unlocking their phone), without requiring the use of wearable audio device unlock process in addition to the phone's unlock process.

C. On-Head Detection

In a further aspect, GUI 500 includes an interface element 506 that can be interacted with to alternatingly enable and disable an on-head detection feature. As shown, interface element 506 is a toggle switch, and thus may also be referred to as the on-head detection toggle 506. In an example embodiment, the on-head detection toggle 506 may be switched to the "on" position to enable the on-head detection feature, and switched to the "off" position to disable the on-head detection feature.

In some embodiments, when on-head detection is enabled and unlock-sync is also enabled, on-head detection may only be used when the master device is unlocked. As such, the wearable audio device will be unlocked while the master device is unlocked, regardless of whether or not the wearable audio device is currently being worn. Then, if the master device is locked and on-head detection is enabled, the wearable audio device may remain in an unlocked state so long sensor data generated at the wearable audio device indicates that the wearable audio device is being worn. However, if the master device is locked and it is determined that the wearable audio device is not being worn, then the master device may automatically instruct the wearable audio device to lock (or the wearable audio device may automatically lock itself).

In other embodiments, when on-head detection is enabled, a determination that the wearable audio device is not being worn may temporarily override the unlock-sync feature (e.g., until it is subsequently determined that the device is being worn). In such embodiments, the wearable audio device may always be disabled (or put into a sleep mode) when the wearable audio device is not being worn. In other words, the wearable audio device may operate in a locked state whenever it is determined that the wearable audio device is not being worn, such that the wearable audio device is locked regardless of whether the master device is locked or unlocked.

In a further aspect of some embodiments, when on-head detection is enabled, use of the wearable audio device unlock process may conditioned upon a determination that the wearable audio device is being worn. In such embodiments, when the wearable audio device is in a locked state, the wearable audio device cannot be unlocked unless the wearable audio device is being worn. In some implementations, the use of the wearable audio device unlock process may only be conditioned upon the wearable audio device being worn when the master device is in a locked state. In other implementations, the use of the wearable audio device unlock process may be conditioned upon the wearable audio device being worn, regardless of whether the master device is being worn. Note that the latter implementation could also partially override the unlock sync feature by preventing the wearable audio device from being unlocked automatically when the master device is unlocked (but could still allow unlock sync feature to keep the wearable audio device unlocked, once the wearable audio device and the master device are both unlocked).

Note that conditioning the separately wearable audio device unlock process on the wearable audio device being worn may, in some cases, prevent the user from inadvertently unlocking their phone when it isn't being worn. For example, if voiceprint authentication is selected as the wearable audio device unlock process, conditioning the voiceprint authentication on the wearable audio device being worn could prevent the wearable audio device from unlocking when a user has taken their wearable audio device off and is talking to a friend (such that their speech is not intended for interaction with the wearable audio device). Other examples are also possible.

Note that a locking schema that is the same or similar to the schema shown in FIG. 4 may be established via GUI 500 by using the unlock-sync toggle 502, the wearable audio device unlock selection element 504, and the on-head detection toggle 506 to concurrently: (a) enable the unlock-sync feature, (b) enable and select a separate wearable audio device unlock process, and (c) enable on-head detection. Enabling these three features may enhance the user experience while also helping to prevent unauthorized use of the wearable audio device and/or the master device. Specifically, enabling these three features concurrently allows the user to: (i) unlock their wearable audio device only with the selected wearable audio device unlock process, and to thus use the wearable audio device to securely access functionality on their smart phone while the smart phone itself is still locked, or (ii) unlock the wearable audio device and their phone using just the phone's unlock process (without requiring the use of separate wearable audio device unlock process), when the user wants to use their wearable audio device and phone concurrently, and at the same will automatically lock their wearable audio device when it is not being worn (and in some cases, prevent the user from inadvertently unlocking their phone when it isn't being worn).

It should be understood that the term "on-head detection" is used for explanatory purposes, and should not be construed as being limited to processes that detect whether a device is on a wearer's head. Rather, the term "on-head detection" should be understood to include any type of process or feature that indicates whether or not a wearable device is being worn by a wearer, on any part of the wearer's body. Thus, the term should be understood to include processes to determine whether or not a wrist-worn computing device (e.g., a smart watch) is being worn on the wrist, or whether an armband device is being worn on the wearer's arm, among other possibilities.

D. Phone Lock Selection

In a further aspect, GUI 500 also includes an interface element 508 that allows for selection of a phone unlock process, which may also be referred to as the phone unlock selection element 508. In the illustrated example, interface element 508 includes a phone lock toggle 508*a*, which enables and disables locking of the phone (and use of a selected phone unlock process to unlock the phone, when locking is enabled). Interface element 508 also includes phone unlock process features 508*b*, which allow for the selection of the particular phone unlock process that can be used to unlock the phone (and in some cases, to unlock both the phone and wearable audio device at once). In the illustrated example, the phone unlock selection element 508 includes phone unlock process features 508*b* for a swipe-pattern authentication process (e.g., using a predetermined swipe pattern on a touchscreen or touchpad), password authentication (e.g., using a predetermined alphanumeric password entered via a keyboard feature), voiceprint authentication, pass phrase authentication, and a combination of a pass phrase and voiceprint authorization.

It should be understood that the GUI 500 shown in FIG. 5 is but one example of a GUI for adjusting parameters of a cross-device security scheme. It is contemplated that variations on the illustrated GUI, which include a subset of the features and elements shown in FIG. 5, and/or which include additional features and/or elements, are also possible. As such, it should be understood that a GUI according to an example embodiment may include other interface elements to adjust lock/unlock parameters of the wearable audio device, and/or to lock/unlock parameters of the device coupled to the wearable audio device. Further, it should be understood that the graphic representation and/or the arrangement on the screen of the features and elements shown in FIG. 5 can vary. Yet further, it should be understood that a GUI according to an example embodiment may also include multiple screens, such that some or all of the illustrated features and elements shown in FIG. 5 are provided on different screens.

VI. Conclusion

It should be understood that any examples described with reference to a "wearable audio device" may apply equally to audio devices that are not configured to be wearable, so long as such audio devices can be communicatively coupled (e.g., tethered) to another computing device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A system comprising:
   a communication interface configured for communication with an audio device;
   a graphic display;
   at least one processor;
   program instructions stored on a non-transitory computer-readable medium and executable by the at least one processor to cause the audio device to switch between operation in a locked state and operation in an unlocked state; and
   program instructions stored on the non-transitory computer-readable medium and executable by the at least one processor to provide a graphical user-interface on the graphic display, wherein the graphical user-interface provides a plurality of interface elements to adjust lock-screen parameters of the audio device, and wherein the plurality of interface elements comprises:
      an interface element for adjustment of an unlock-sync feature, wherein enabling the unlock-sync feature causes the audio device to operate in an unlocked state whenever the master device is in an unlocked state, and wherein disabling the unlock-sync feature allows the audio device to operate in a locked state when the master device is in an unlocked state; and
      an interface element for selection of an audio device unlock process, wherein the selected audio device unlock process responds to an authentication of a user by unlocking the audio device, without unlocking the master device and regardless of whether the master device is in the locked state or the unlocked state;
   program instructions stored on the non-transitory computer-readable medium and executable by the at least one processor to:
      receive, via the at least one interface element for adjustment of the unlock-sync feature, first input data indicating to enable the unlock-sync feature;
      in response to the first input data, enable the unlock-sync feature;
      receive, via the at least one interface element for adjustment of the unlock-sync feature, second input data indicating to disable the unlock-sync feature; and
      in response to the second input data, disable the unlock-sync feature.

2. The system of claim 1, further comprising program instructions stored on a non-transitory computer-readable medium and executable by the at least one processor to receive a communication from the audio device that is indicative of whether or not the audio device is being worn, wherein the communication comprises or is based on sensor data generated by at least one sensor of the audio device.

3. The system of claim 1, further comprising:
   a data interface configured to receive sensor data that is indicative of whether or not the audio device is being worn; and
   an on-head detection module comprising program instructions stored on a non-transitory computer-readable medium and executable by the at least one processor to:
      analyze the sensor data to determine whether or not the audio device is being worn; and
      in response to a determination that the audio device is not being worn, lock the audio device.

4. The system of claim 3, further comprising program instructions stored on a non-transitory computer-readable medium and executable by the at least one processor to:
   while the master device is in a locked state, allow the audio device to remain in an unlocked state so long as the sensor data indicates that the audio device is being worn.

5. The system of claim 3, further comprising program instructions stored on a non-transitory computer-readable medium and executable by the at least one processor to:
   disable the on-head detection module when the master device is in an unlocked state; and
   enable the on-head detection module in response to an instruction to lock the master device.

6. The system of claim 1, further comprising program instructions stored on the non-transitory computer-readable medium and executable by the at least one processor to:
   while the unlock-sync feature is enabled and the master device is in a locked state, receive authentication input data corresponding to an unlock process for the master device;
   verify the authentication input data; and
   in response to verification of the authentication input data, unlock both the master device and the audio device.

7. The system of claim 1, further comprising program instructions stored on the non-transitory computer-readable medium and executable by the at least one processor to:
   while the unlock-sync feature is disabled, and while both the master device and the audio device are locked, receive input data indicating an audio device unlock request; and
   in response to the input data indicating the audio device unlock request, initiating the selected audio device unlock process.

8. The system of claim 7, wherein the selected audio device unlock process comprises:
   receiving input data indicating the audio device unlock request via an interface component of the master device or the audio device;
   in response to the input data indicating the audio device unlock request, enabling at least one microphone on at least one of the master device and the audio device;
   receiving audio authentication input data via the at least one microphone;
   verifying the audio authentication input data; and
   in response to verifying the audio authentication input data, unlocking the audio device.

9. The system of claim 8, wherein verifying the audio authentication input data comprises carrying out a voiceprint process on the audio authentication input to determine if a voiceprint of the audio authentication input data matches a voiceprint stored in an account that is associated with at least one of the audio device or the master device.

10. The system of claim 8, wherein verifying the audio authentication input data comprises:
    applying a speech-to-text process to the audio authentication input data to determine a speech segment; and
    determining that the speech segment matches a password specified by an account that is associated with at least one of the audio device or the master device.

11. The system of claim 1, further comprising program instructions stored on the non-transitory computer-readable medium and executable by the at least one processor to determine whether or not the audio device is being worn.

12. The system of claim 11, further comprising program instructions stored on the non-transitory computer-readable medium and executable by the at least one processor to condition the audio device unlock process upon a determination that the audio device is being worn, such that the audio device cannot be unlocked unless the audio device is being worn.

13. The system of claim 11, further comprising program instructions stored on the non-transitory computer-readable medium and executable by the at least one processor to override the unlock-sync feature in response to a determination that the audio device is not being worn, such that the audio device is locked regardless of whether the master device is locked or unlocked.

14. A computer-implemented method comprising:
- displaying, on a graphic display a master computing device, a graphical user-interface that provides a plurality of interface elements to adjust lock-screen parameters of the audio device, wherein the plurality of interface elements comprises: (a) an interface element for adjustment of an unlock-sync feature, wherein enabling the unlock-sync feature causes an audio device to operate in an unlocked state whenever the master computing device is in an unlocked state, and wherein disabling the unlock-sync feature allows the audio device to operate in a locked state when the master computing device is in an unlocked state, and (b) an interface element for selection of an audio device unlock process, wherein the selected audio device unlock process responds to an authentication of a user by unlocking the audio device, without unlocking the master computing device and regardless of whether the master computing device is in the locked state or the unlocked state;
- receiving, by the master computing device, via the at least one interface element for adjustment of the unlock-sync feature, first input data indicating to enable the unlock-sync feature;
- in response to receipt of the first input data, the master computing device enabling the unlock-sync feature;
- receiving, by the master computing device, via the at least one interface element for adjustment of the unlock-sync feature, second input data indicating to disable the unlock-sync feature; and
- in response to receipt of the second input data, the master computing device disabling the unlock-sync feature.

15. The method of claim 14, further comprising receiving a communication from the audio device that is indicative of whether or not the audio device is being worn, wherein the communication comprises or is based on sensor data generated by at least one sensor of the audio device.

16. The method of claim 14, further comprising:
- receiving sensor data that is indicative of whether or not the audio device is being worn;
- analyzing the sensor data to determine whether or not the audio device is being worn; and
- in response to a determination that the audio device is not being worn, causing the audio device to operate in the locked state.

17. The method of claim 16, further comprising, while the master computing device is in a locked state, allowing the audio device to remain in an unlocked state so long as the sensor data indicates that the audio device is being worn.

18. The method of claim 14, further comprising:
- while the unlock-sync feature is enabled and the master computing device is in a locked state, receive authentication input data corresponding to an unlock process for the master computing device;
- verifying the authentication input data; and
- in response to verification of the authentication input data, unlocking both the master computing device and the audio device.

* * * * *